(12) United States Patent
Zumberge et al.

(10) Patent No.: US 6,788,417 B1
(45) Date of Patent: Sep. 7, 2004

(54) OPTICAL FIBER INFRASOUND SENSOR

(75) Inventors: Mark Zumberge, San Diego, CA (US); Jonathan Berger, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/303,331

(22) Filed: Apr. 30, 1999

(51) Int. Cl.[7] ............................... G01B 9/02
(52) U.S. Cl. ................... 356/477; 385/12; 385/13
(58) Field of Search .................. 385/12, 13; 356/477, 356/345, 35.5; 250/227.19

(56) References Cited

U.S. PATENT DOCUMENTS

| | | | | |
|---|---|---|---|---|
| 4,162,397 A | * | 7/1979 | Bucaro et al. | 250/199 |
| 4,235,113 A | * | 11/1980 | Carome | 73/655 |
| 4,712,429 A | * | 12/1987 | Raspet et al. | 73/646 |
| 5,178,153 A | * | 1/1993 | Einzig | 128/692 |
| 5,218,418 A | * | 6/1993 | Layton | 356/345 |
| 5,737,278 A | * | 4/1998 | Frederick et al. | 367/149 |
| 5,838,485 A | * | 11/1998 | de Groot et al. | 356/361 |

OTHER PUBLICATIONS

Daniels, F.B., "Noise Reducing Line Microphone for Frequencies Below 1 c.p.s.", The Journal of the Acoustical Society of America, vol. 31, No. 4, Apr. 1959, pp. 529–531.
Burridge, R., "The Acoustics of Pipe Arrays", Geophys. J.R. Astr. Soc., 26, 1971, pp. 53–69.

* cited by examiner

Primary Examiner—Frank G. Font
Assistant Examiner—Andrew H. Lee
(74) Attorney, Agent, or Firm—Greer, Burns & Crain, Ltd.

(57) ABSTRACT

Infrasound signals in the band 0.02 to 4 Hz are sensed in the presence of ambient noise generated chiefly by wind as integrated pressure variations, which induce detectable changes in the optical path length, along optic fibers, typically extending 100 m. to 1000 m. and more, arrayed at arbitrary geometries. Two fibers connected as a Michelson, Mach-Zehnder or equivalent interferometer where (i) one fiber is coupled to atmosphere while (ii) the other is not for being hermetically sealed in a tube, permit common mode rejection of noise from (i) temperature changes and (ii) strain, including ground vibration. Because the optic fiber infrasound sensors are longer than the distance over which wind-induced pressure changes are coherent, the effects of wind noise on the sensing of infrasound is reduced, and signal-to-noise ratio is increased over a wide bandwidth.

27 Claims, 7 Drawing Sheets

OPTICAL FIBER INFRASOUND SENSOR

STATEMENT OF GOVERNMENT INTEREST

This invention was made with Government assistance by National Science Foundation under Contract No. OPP 96-15454. The Government has certain rights in this invention.

BACKGROUND OF THE INVENTION

1. Field of the Invention

The present invention generally pertains to methods for the sensing of, and sensors for the detection of, very low frequency pressure waves, particularly in the atmosphere as infrasound.

The present invention particularly concerns fiber optic pressure sensors, and the arrangement of fiber optic pressure sensors as an interferometer in order to detect infrasound with common mode rejection of (i) temperature and (ii) strain or vibration noise, and with a high signal-to-noise ratio of (iii) detected infrasound versus wind noise.

2. Background of the Invention

2.1 Infrasound

Infrasound signals are very low frequency (0.01 to 10 Hz) pressure waves that travel through the atmosphere. They have been detected using conventional pressure gauges; usually electro-mechanical barometers which measure pressure at a point.

Noise from wind makes sensing these signals difficult. Indeed, the key weakness in existing infrasound detection systems is the rapid deterioration in the signal-to-noise ratio with increasing wind velocity. To increase sensitivity researchers have attached conventional pressure gauges to long tubes perforated with variously distributed holes in attempts to average out the noise from the wind. Propagation effects in these mechanical filters limit their effectiveness.

Studies in infrasound detection often center on techniques of noise reduction. Almost all work to date consists or recording pressure at a single point while an attempt is made to force the pressure at that point to be representative of the pressure averaged along a line or over an area. As previously stated, a series of perforated pipes or permeable hoses are typically connected to a microphonic sensor. Pressure noise along the pipe's length is partially incoherent while, for pipe lengths less than the wavelength of interest (typically a few hundred meters), the signal is coherent. The aim of the mechanical filter is to add pressure variations at discrete inlets along its length so that the incoherent noise will average away while the signal is enhanced. Conceptually, one can envision the ideal case or many sensors in an array separately recorded and their signals added together electronically.

Figure 1:
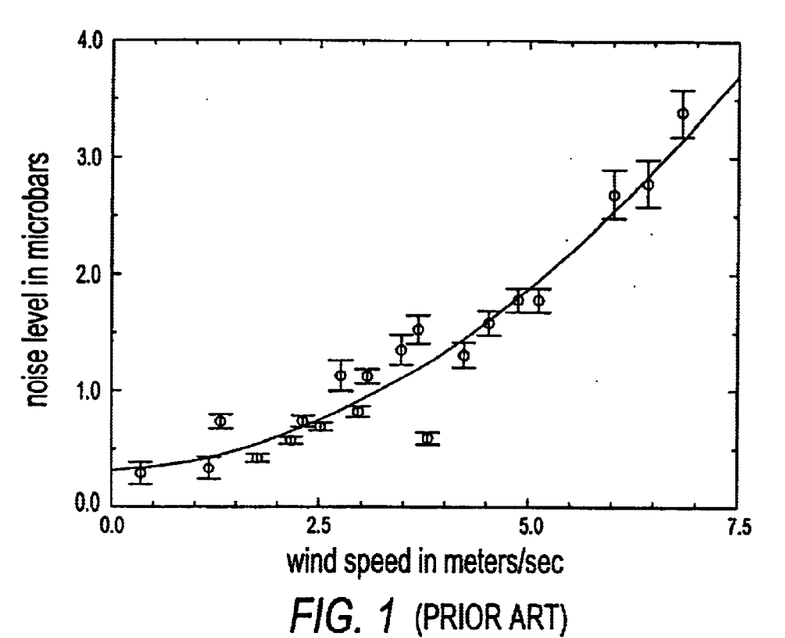
FIG. 1 is a prior art graph showing observations of infrasonic noise versus wind speed in and through a prior art system of about 0.5 Hz. bandwidth, from Clauter & Blanford, 1996.

Prior art observations of infrasonic noise versus wind speed through and in a system or about 0.5 Hz bandwidth will be shown in graph form in FIG. 1 of this specification. Reference Clauter & Blandford, 1996. A prior art observed spectrum of infrasonic noise under calm wind conditions at Warrarmunga, Central Australia from Christie, et al., 1978, will be shown in FIG. 2 of this specification.

Significant efforts have gone into the designs of prior art mechanical filters. One of the more venerable devices is the Daniels filter (Daniels, 1959), which relics on pipes of varying diameter to create a series or acoustic impedance changes with the hope of reducing acoustic reflections in the pipe. Burridge (1971) analyzed this type of "pipe-microbarograph" and similar configurations. When added acoustically in the filter pipe, there exists a phase delay for each element caused by the finite speed of sound. Burridge modeled pipes with varying (i) dimensions, (ii) numbers of inlets, and (iii) acoustic impedances to find the best compromise response flattening and attenuation minimization. In all cases, however, the response clearly is a compromise. The difficulty becomes greater as the frequency increases. As Burridge showed, flat response above 0.1 or 1 Hz are not attainable.

2.2 Infrasound Detection as Part of the Comprehensive Test Ban Treaty (CTBT)

As part of the international monitoring system of the Comprehensive Test Ban Treaty (CTBT), infrasound signals in the band 0.02 to 4 Hz must be detected in the presence of ambient noise generated chiefly by wind. Thus effectiveness of acoustic filters employed in standard infrasound sensors is limited by pressure propagation and attenuation characteristics within the filter. To improve the filtering characteristics, an optical fiber for sensing the integrated pressure variations along a line has been designed. The optic fiber sensor can easily average over kilometer-scale lengths of arbitrary geometry with an averaging bandwidth governed by the speed of light and thus should offer significant practical advantages in reducing the effect of wind noise and thus increasing the signal-to-noise ratio over a wide bandwidth.

2.2.1 Specific Previous Infrasound Detection

Infrasonic monitoring is an effective, low cost technology for detecting atmospheric explosions of nuclear weapons. The low frequency components of explosion signals propagate to long ranges (a few thousand kilometers) where they can be detected with arrays of infrasound sensors.

A prototype infrasound system for use under a comprehensive test ban treaty has been constructed by the United States. The system is near real time, automated and unattended.

The United States Infrasound Sensor System Prototype is consistent with a specification in a Preparatory Commission document prepared under the Comprehensive Test Ban Treaty (CTBT), The system is a four-element array in a triangular layout with an infrasound sensor element at each corner and one in the center. The prototype infrasound sensor element spacing is 1 km, however, the specifications provide for an optional spacing up to 3 km. All prototype components are exportable and operable over a wide range of environmental conditions.

System security is provided by housing the array element hardware (sensor, digitizer, authenticator, etc.) in a secure enclosure. The enclosure is buried in the ground and is protected by active (switch closure) and passive tamper detection devices.

The objectives of the United States Infrasound Sensor System Prototype are to reliably acquire and transmit near-real-time infrasonic data to facilitate the rapid location and identification of atmospheric events. The prototype system is also directed to providing documentation that could be used by the United States and foreign countries to procure infrasound systems commercially to fulfill their CTBT responsibilities.

Detail requirements for infrasound monitoring set by The Conference on Disarmament and the CTBT Preparatory Commission (PrepCom) are as follows.

A wideband microbarograph, or equivalent such as the instrument of the present invention, should exhibit a flat frequency response from 0.02 to 4.0 Hz.

An array of four such elements, with a sensor spacing from 1 to 3 km is typical. The Conference on Disarmament and the CTBT Preparatory Commission (PrepCom) recommended an equilateral triangular array, 1 to 3 km on a side. An array element is located at each corner and at the center.

Sensor noise should be at least 18 dB below the minimum acoustic noise of 5.0 mPa at 1.0 Hz.

Sensors should include acoustic filtering of wind noise. In previous sensors this is realized with noise reduction pipes.

Resolution should be better than 1 count per mPa.

Dynamic range should be at least 108 dB.

The sensor array would usefully provide a data stream at a sample rate of about 10 samples per second (sps). Data from all array elements would desirably be authenticated.

An exemplary prior art microbaragraph (above) is a 10" diameter Chaparral Physics model 4.11. The vendor re-packaged the sensor to accommodate the above data survey features. The infrasound system includes four array elements, intra-site communications, and a host receiving station.

The components that make up the infrasound system also include an array of infrasound detector elements each containing a sensor, a digitizer with GPS, and a data authenticator. A host receiving station contains a multiplexer, data displays and state-of-health displays. The host receiving station also transmits the data to the NDC in near real time.

The array element hardware (sensor, digitizer, authenticator, etc.) is housed in an enclosure (a utility box) to provide system security. The enclosure is buried in the ground and is protected by tamper detection devices such as a switch closure. This level of protection is necessary to protect the data authentication process.

2.2.2 Specific Previous Detection of Infrasound, and Ongoing Research, Under the Comprehensive Test Ban Treaty (CTBT)

The infrasound monitoring envisioned for the International Monitoring System (IMS) under the CTBT uses a worldwide network of infrasonic sensors to monitor the low-frequency acoustic signals resulting from explosions. This is a primary IMS system for monitoring atmospheric explosions, and it should also be a resource for shallow buried underground and underwater events. To monitor the CTBT, arrays of infrasound microphones will be employed that are capable of detection of kiloton-type explosions out to 3,000 to 5,000 km.

The goal of the Department of Energy's Infrasound Monitoring Research is to improve the US government's capability to detect and identify low-frequency acoustic signals from atmospheric, shallow buried, or moderately shielded explosions. This invention is in accordance with this goal.

The DOE Infrasound research priorities are a follows:

The signal-to-noise ratio would be desirably reduced through enhanced array design and optimized noise-reduction methods. The present invention will be seen to accomplish this in a broad and substantial manner.

Understanding of the propagation of infrasound waves by developing advanced tools and compiling global wind data would desirably be improved.

An enhanced understanding of natural infrasound sources, such as meteors, is desired so as to reduce false alarms.

A fully tested and documented prototype infrasound system that reliably acquires infrasound data for the rapid location and identification of atmospheric events should be made commercially available. The Infrasound System is such a commercializable, fully documented, system.

Optimal functioning of the IMS infrasound network would desirably be ensured by the assistance of its manufacturer in the development of site-survey and station installation procedures.

DOE Laboratories are involved in infrasound research, circa 1999. The primary DOE laboratory involved in infrasonic monitoring research is Los Alamos National Laboratory. LANL is supported by research efforts in the private sector and by Sandia National Laboratories for developing, testing and documenting the prototype Infrasound system and evaluating infrasound sensors.

2.3 Properties of Optical Fibers

In another technical area, optical fibers are known to be sensitive to hydrostatic pressure. They thus present some potential as sensors of acoustic pressure, including infrasound. Alas, optical fibers are also sensitive to temperature and to strain.

In order to make an infrasound sensor using optical fiber sensor, it would seemingly be necessary to make an optic fiber that was appropriately sensitive to pressure variations caused by infrasound while being insensitive to temperature and strain, the two other parameters to which optical fibers are largely sensitive. The optical fiber sensor would desirably be of almost unlimited length, thereby permitting the averaging of wind-induced noise over long distances.

SUMMARY OF THE INVENTION

The present invention contemplates improving the signal-to-noise ratio between wind noise and infrasound during the detection of infrasound by using a new type pressure, or sound, or infrasound detector, namely an optic fiber, that extends for so many hundreds and thousands of meters that wind noise is not coherent along its length. Pressure changes in the optic fiber are detectable as variations in a modulated optical (light) signal transmitted along the length of the fiber. The wind noise is integrated and detected as, at most, a small offset signal to the detected infrasound signal.

The present invention further contemplates combining, in the manner of a Michelson or Mach-Zehnder or equivalent interferometer, two of the new type sensors to make an infrasound detection system. Namely, (i) a first greatly-linearly-extending fiber optic pressure sensor that is exposed to the atmosphere is combined with (ii) a second, co-parallel, fiber optic pressure sensor that is hermetically sealed. These two sensors—plus such external components as permit of insertion and detection of the optical (light) signal within each optic fiber, and the transformation of the optical (light) signals so detected into electrical signals subsequently interpretable as infrasound—collectively constitute a sensitive infrasound detection system with a high signal to noise ratio. This is because the arrangement of two fiber optic pressure sensors as an interferometer accords common mode rejection of (i) temperature and of (ii) strain or vibration noise, including such as may be due to earth movement.

1. A Fiber Optic Infrasound Sensor

Therefore, in one of its aspects the present invention is embodied in a fiber optic pressure sensor.

The fiber optic pressure sensor is characterized in that a fiber optic—in which optic fiber pressure is sensed by (i) injection of optical radiation into the fiber and (ii) detection of the change in optical length of the fiber proportional to change in the integral of pressure along the fiber—extends in the atmosphere for greater than the coherence length of wind in the atmosphere. Regardless of what other pressures within the atmosphere and in the environment of its deployment in the atmosphere the fiber optic may sense, the fiber optic will be less sensitive to pressure changes due to wind. This is because any atmospheric pressure changes arising from wind not being coherent over the extent of the optic fiber, will be substantially integrated along the length of the fiber, and this integration over greater than a coherence length of a function being integrated—i.e., the function of wind pressure along the length of the optic fiber—will produce a greatly reduced signal.

The fiber optic pressure sensor preferably extends substantially linearly in the atmosphere, in a substantially straight line. It preferably so extends for more than one hundred meters, more preferably for more than one kilometer.

Pressure within the fiber optic is preferably sensed by (i) injection of laser light optical radiation into the fiber.

Importantly the diameter of the fiber permits detection of atmospheric infrasound from at least 0.4 to 10 Hz frequency. It should be understood that the incremental step size of detectable variation in the propagation path along the fiber is in the order of fiber diameter. Therefore an appropriately small diameter permits of the detection of atmospheric infrasound. The diameter of the optic fiber is preferably less than 200 µm, and is more preferably about 125 µm.

2. A Fiber Optic Infrasound Detection System

In another of its aspects the present invention is embodied in a fiber optic infrasound detection system.

The system includes a source of modulated light illumination and an equal-arm Michelson or Mach-Zehnder or equivalent interferometer. The interferometer has a first optic fiber exposed to atmosphere and extending for greater than 100 meters from the source of modulated light illumination, and a second optic fiber, hermetically sealed from the atmosphere, extending alongside the first optic fiber from the source of modulated light illumination.

Light from the source of modulated light illumination is transmitted along both fibers. It is so transmitted in accordance with any changes in optical length of the fibers responsively to, inter alia, pressures and temperatures and strains to which each fiber is subject.

It will in particular be recognized by those familiar with light transmission along optic fibers that, for pressure-induced changes in optical length:

$$\Delta l_{op}/l_{op} \alpha \int \Delta P(x) dx$$

In words (as opposed to mathematics): the change in optical length relative to optical length is proportional to the integral of the changes in pressure along the length of the optic fiber.

A detector receives the light transmitted along both optic fibers and detects changes in the difference between the optical lengths of both optic fibers. The detector is sensitive in a frequency band including from at least 0.2 to 4 Hz.

According to this construction, changes in optical lengths as result from, inter alia, (i) changes in temperature and (ii) changes in strain—including as are due to earth movement—are all substantially canceled due to the interferometric arrangement of the two optic fibers. However, (iii) atmospheric pressure changes arising both from wind and from infrasound can sensed in the frequency band. But, it should be recalled, pressure changes due to the wind are not coherent over the greater than 100 meter extent of the optic fibers. Accordingly, detection of changes in optical length due to atmospheric pressure changes arising from the wind is substantially the integration of these wind-induced changes along the length of the fiber, and is small.

Thus the detector serves to sense atmospheric pressure changes due to infrasound over the lengths of both optic fibers at a high signal to noise ratio over those atmospheric pressure changes due to any of (i) temperature, (ii) strain and vibration, and (iii) wind.

In the most preferred construction, the source of modulated light illumination and the detector are both at the same end of the optic fibers. Namely, both the first and the second optic fiber extends from the source of modulated light illumination to mirrored ends. Light is thus reflected along both optic fibers. (The reflected light path is in accordance with, inter alia, the pressures and temperatures and strains to which each fiber is subject.)

The source of modulated light illumination is typically a laser, and is more typically a laser diode.

The first and the second optic fiber normally extend linearly for up to a kilometer or more.

The second fiber of the equal-arm Michelson or Mach-Zehnder or equivalent interferometer is preferably hermetically sealed in a metal tube, more preferably in a 0.030" diameter stainless steel tube. To ensure that the (i) thermal and (ii) strain characteristics of both fibers are as nearly equal as is possible, the first fiber may also be placed within a like metal tube save only that the tube is perforated, and open to the atmosphere.

The detector of the light reflected in both fibers preferably includes a beamsplitter of (i) light from the source of modulated light illumination and (ii) the light reflected in both fibers; a signal processor receiving a signal from the beamsplitter; and a modulator responsive to the signal processor for modulating light from the source of modulated light in accordance with the signal received by the signal processor. By this feedback pressure changes within band are tracked.

3. A Method of Detecting Infrasound

In yet another of its aspects the present invention is embodied in a method of detecting infrasound.

In the method modulated light illumination is provided by, and from, a light source into each of a first optic fiber exposed to atmosphere, and a co-parallel second optic fiber hermetically sealed from the atmosphere. Each fiber extends from the source of modulated light illumination to a mirrored end.

Light is reflected along both fibers in accordance with inter alia, pressures and temperatures and strains to which each fiber is subject. The light reflected in both fibers is detected in a frequency band including from at least 0.2 to 4 Hz so that changes in optical lengths of both fibers as are due to, inter alia, variations in (i) temperature, (ii) strain—including as is due to earth movement—and (iii) pressure—as arises both from wind and from infrasound—will all be detected.

However, detected changes in optical length due to variations in (i) temperature and in (ii) strain are substantially canceled due to the interferometric arrangement of the two fibers.

Moreover, changes in optical length due to wind-induced pressure changes are not coherent over the extent of the fiber. Thus the detection of pressure changes arising from the wind is a substantial integration of these changes along the length of the fiber, and is small.

Accordingly, the detecting primarily serves to sense atmospheric infrasound, only.

The providing of modulated light illumination is preferably from a laser light source, and more preferably from a laser diode.

The co-parallel extensions of the first optic fiber that is exposed to the atmosphere, and the second optic fiber that is hermetically sealed, is preferably linear (in a straight line), and for at least 100 meters. The extension is more preferably linearly for at least 1000 meters.

The detecting preferably includes (1) splitting in a beamsplitter of (i) light from the source of modulated light illumination and (ii) the light reflected in both fibers; (2) receiving in a signal processor a signal from the beamsplitter, and (3) processing this received signal to cancel signal contributions from changes (i) in temperature and (ii) in strain (including as are due to earth movement), while sensing (iii) pressure as arises both from wind and from infrasound.

After this (2) receiving and processing in the signal processor, the detecting further preferably includes modulating in a modulator responsively to the signal processor light from the source of modulated light in accordance with the signal received by the signal processor.

These, and other aspects and attributes of the present invention, will become increasingly clear upon reference to the following drawings and attached specification.

BRIEF DESCRIPTION OF THE DRAWINGS

FIG. 4, consisting of FIGS. 4a and 4b, are respective cut-away side and cross-sectional views of a first embodiment of the fiber optic pressure sensor, previously seen in part of FIG. 3, of the present invention.

FIG. 5, consisting of FIGS. 5a and 5b, are respective cut-away side and cross-sectional views of a second embodiment of the fiber optic pressure sensor, previously seen in part of FIG. 3, of the present invention.

DESCRIPTION OF THE PREFERRED EMBODIMENT

The present invention is embodied in a new infrasound sensor designed specifically to maximize the signal-to-nose ratio, and thus increase the sensitivity, for detection of pressure waves in the atmosphere in a band from about 0.02 Hz to about 10 Hz. This band includes both (i) infrasound and (ii) wind. The sensor of the present invention will discriminate against the detection of pressure changes due to wind in favor of pressure changes due to infrasound; it will have a high infrasound-to-wind pressure change detection ratio. When it is desired to detect infrasound, and when pressure changes induced by wind constitute only noise, the new infrasound sensor of the present invention excels.

Discrimination between (i) infrasound pressure waves in the atmosphere, and (ii) wind-induced pressure changes in the atmosphere, is possible because infrasound waves, such as may be produced by explosions, have long coherence lengths whereas wind-induced pressure changes are essentially incoherent over distances of one hundred meters (100 m) or more. The new pressure sensor of the present invention is based on an optic fiber of such great length in the atmosphere, i.e., 100 meters or more, that infrasound-induced pressure fluctuations—which are coherent over the great physical length of the sensor—may be distinguished from wind-induced pressure fluctuations—which are not coherent over the great physical length of the sensor—may be distinguished in the sensor. The sensor is thus called an optic fiber infrasound sensor.

These fiber optic infrasound sensor of the present invention is directed towards objectives (1) of enhancing the operational monitoring capability of the Comprehensive Test Ban Treaty (CTBT) at a decreasing cost and (2) increasing the effectiveness of infrasound monitoring through improved understanding of basic phenomenology.

The key weakness in existing infrasound detection systems is the rapid deterioration in the signal-to-noise ratio with increasing wind velocity. The system of the present invention significantly improves this signal-to-noise. In accordance with the present invention, and through the use of optic-fiber technology, a new infrasound pressure sensor is capable of averaging infrasonic signals (i) along kilometer-scale line lengths with (ii) an averaging phase-delay governed by the speed of light—rather than the speed of sound as is the case with existing infrasonic filters. Because noise due to wind is not coherent along the (i) kilometer-scale line length of the optic fiber sensor, while the (ii) averaging phase-delay is fast, wind noise is essentially canceled, and the infrasound detection sensor of the present invention is substantially insensitive to wind noise.

The present invention further extends to the use of two infrasound sensors of the new optic fiber type in an equal-arm Michelson (or Mach-Zehnder or equivalent) interferometer. The interferometer permits a substantial cancellation of effects of (i) temperature, and (ii) strain, to which the elongate optic fibers are subject. Accordingly, the interferometer based on the new optic fiber pressure sensors is highly discriminating in sensing infrasound, only, at a high ratio of signals due to infrasound relative to signals due to noise of diverse origins and types. The equal-arm Michelson (or Mach-Zehnder or equivalent) interferometer configuration of the two optic fiber infrasound sensors is thus called an infrasound detector system.

1. Genesis and Development of Infrasound Sensors and Infrasound Detection Systems in Accordance with the Present Invention In accordance with the development of the invention, a small-scale fiber-optic infrasound sensor has been subject to laboratory evaluation to determine the noise level in the laboratory, and to estimate actual field performance. A larger instrument is slated, circa 1999, for field deployment at an existing geophysical observatory. A variety of deployment configurations that minimize noise in a real field environment are anticipated.

The prototype fiber-optic infrasound sensor is being constructed in the La Jolla, California, laboratories of the Institute of Geophysics and Planetary Physics of the Scripps Institution of Oceanography, University of California, San Diego. The inventors have previously built at this laboratory several optical fiber sensors which are currently deployed for geophysical research. These sensors are located in a variety of applications and locations which include bore hole, sea floor, and Antarctic settings.

Following the new sensor's, and new detector's development and laboratory testing, a full-scale field version is to be deployed at the University of California San Diego's Pinon Flat Observatory (PFO) in southern California. Note that Pinon Flat has been designated in the Comprehensive Test Ban Treaty (CTBT) as the site of an official infrasound monitoring station, so that results obtained through this deployment will have a direct and practical bearing on the design and deployment of infrasound sensing and detection systems under the CTBT.

Existing facilities at the PFO site include a suite of other geophysical monitoring equipments including the following. A GSN station is designated for use as an auxiliary seismic monitoring station. A 10 element telemetered broadband seismic array is available, as are three 1 km laser stain seismographs. GPS geodetic monitoring is performed. The sum of these real-time data acquisition facilities permits collection and transmission of infrasound data from the field site to the IGPP.

In use of the infrasound sensors and infrasound detection systems of the present invention, infrasonic signals are observed from events at all distance ranges, with the dominant period or the signal being a function of source size. Propagation characteristics of acoustic gravity waves in the atmosphere at long-range distances are well known (e.g., Press and Harkrider, 1962), and infrasonic signals have been seen from various large natural events and man-made events. These include great earthquakes (e.g., Mikurno, 1968), explosive volcanoes (Eissler, 1986) atmospheric nuclear explosions (Down and Ewing 1962), and smaller conventional explosions.

The basis specification of infrasonic monitoring stations for the International Monitoring System of the CTBT have long been established, but the ultimate goal of infrasonic monitoring is to optimize the detection capability for signals of interest. The task is to record accurately small changes in ambient air pressure from frequencies of a few hertz to periods of 50 seconds. The measurement of infrasonic signals in this band presents a classical problem of maximizing the signal-to-noise ratio while maintaining some capacity to estimate accurately event azimuth by recording in an array configuration with a spatial separation determined by the wave number of interest. The principal source of noise in the frequency band of interest is turbulence in the wind field.

Typical variations in wind speed cause pressure variations of hundreds of microbar ($\mu$bar), while the signals or interest are typically a few $\mu$bar or less. This principal component of the noise field is caused by small-scale turbulence, and travels essentially with the wind speed, on the order of a few meters per second (m/s) to a few tens of meters per second (m/s). Infrasonic signals, on the other hand, travel as acoustic-gravity waves with group velocities around 280–340 m/s, reducing to acoustic pressure waves traveling with the velocity of sound at high frequencies (Press and Harkrider, 1962).

2. Recapitulation of the Previous Infrasound Sensors and Previous Infrasound Detection Systems, and their Performance As previously explained in the BACKGROUND OF THE INVENTION section of this specification, previous studies in infrasound sensing and detection often center on techniques of noise reduction. Almost all work to date consists or recording pressure at a single point while an attempt is made to force the pressure at that point to be representative of the pressure averaged along a line or over an area. Typically, a series of perforated pipes or permeable hoses are connected to a microphonic sensor. Pressure noise along the pipe's length is partially incoherent while, for pipe lengths less than the wavelength of interest (typically a few hundred meters), the signal is coherent. The aim of the mechanical filter is to add pressure variations at discrete inlets along its length so that the incoherent noise will average away while the signal is enhanced. Conceptually, one can envision the ideal case or many sensors in an array separately recorded and their signals added together electronically.

FIG. 1 illustrates observations of noise levels observed on infrasonic sensors at AFTAC operational sites as a function of wind speed observed at nearby meteorological stations (Clauter and Blanford, 1996). This shows that the low wind speed end asymptote of infrasonic noise for a system with a bandwidth or about 0.5 Hz is around 0.3 $\mu$bar.

Figure 2:
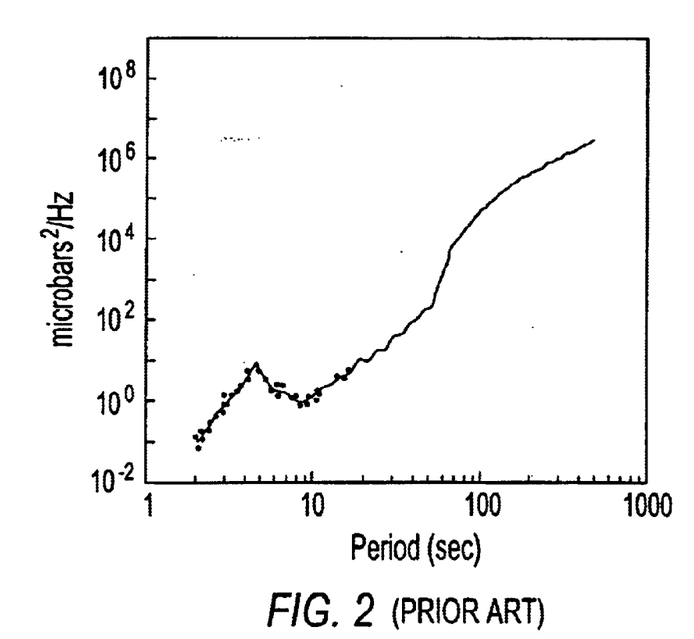
FIG. 2 is a prior art graph showing the observed spectrum of infrasonic noise under calm wind conditions at Warramunga, Central Australia, from Christie, et al., 1978.

FIG. 2 shows the power spectral density of typical ambient noise at one site, the Warramunga Array in the Northern Territory of Australia, under low (−1 m/s) wind conditions (Christie, personal communication). The noise continues to decrease below 2 seconds (Christie, personal communication), but not as fast as between 6 and 2 seconds where the fall off is controlled in part by the microbarom peak. Analogous to the microseism peak in ambient ground noise seen on seismometers, the storm-associated microbaroms, with dominant energy around 5 seconds period, are always present at some level in infrasonic recordings. Microbaroms seldom have amplitudes less than 0.3 $\mu$bar but may often exceed 8 $\mu$bar. Like the microseisms, amplitudes of microbaroms vary considerably from place to place and have a strong seasonal variability.

Significant efforts have gone into the designs of these mechanical filters. One of the more venerable devices is the Daniels filter (Daniels, 1959), which relies on pipes of varying diameter to create a series of acoustic impedance changes with the hope of reducing acoustic reflections in the pipe. Burridge (1971) analyzed this type of "pipe-microbarograph" and similar configurations. When added acoustically in the filter pipe, there exists a phase delay for each element caused by the finite speed of sound. Burridge modeled pipes with varying dimensions, numbers of inlets, and acoustic impedances to find the best compromise response flattening and attenuation minimization. In all cases, however, the response clearly is a compromise. The difficulty becomes greater as the frequency increases. As Burridge showed, flat response above 0.1 or 1 Hz are not attainable.

Figure 4A:
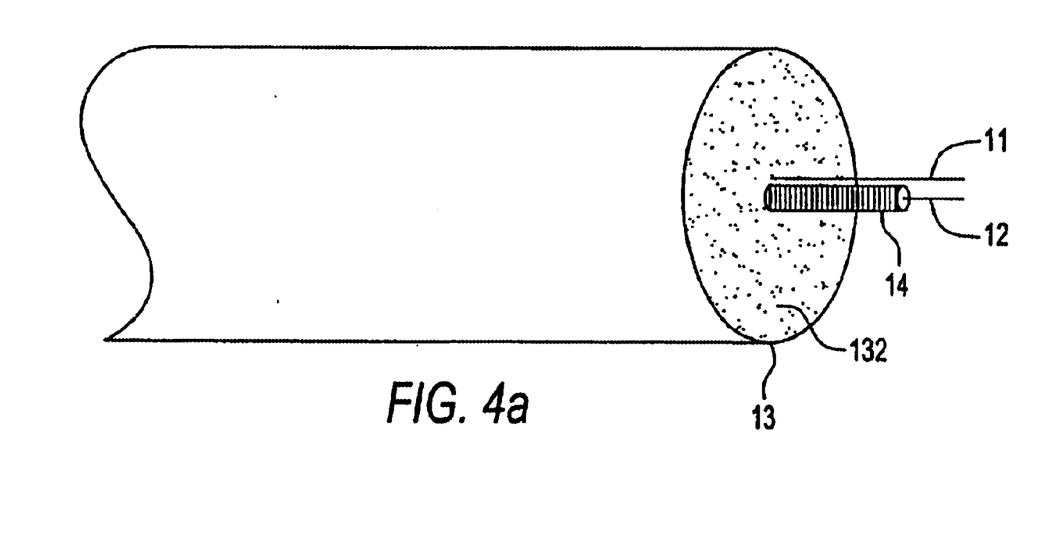
Figure 4B:
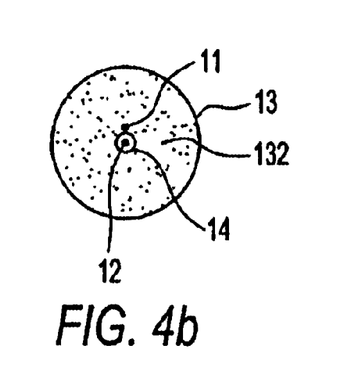
Figure 5A:
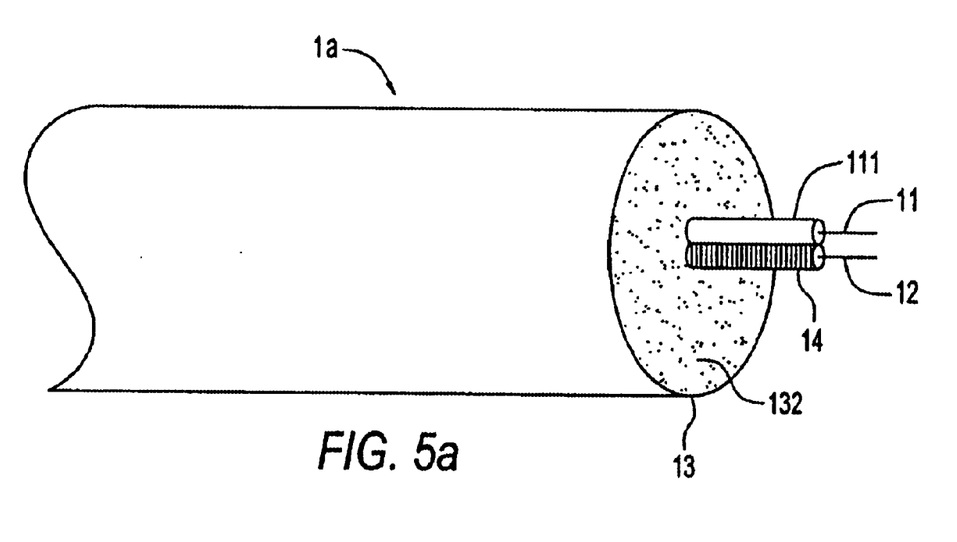
Figure 5B:
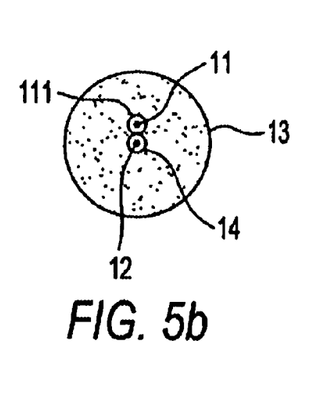

3. The Optic Fiber Infrasound Sensor, and Optic Fiber Infrasound Detection System, of the Present Invention Previous infrasound sensors, and infrasound detection systems, just described may be contrasted with the preferred embodiments of a fiber-optic infrasound sensor, and infrasound detection system, in accordance with the present invention shown in combination side, and schematic-block-diagram, view in FIG. 3. Two embodiments of the composite infrasound sensor portion of the infrasound detection system are shown in FIGS. 4 and 5.

A most rudimentary infrasound sensor, proper, consists only of an optical fiber inside a protective cover, preferably a long hose that is preferably fluid-filled. Such a rudimentary infrasound sensor is most typically deployed along the ground surface.

Figure 3:
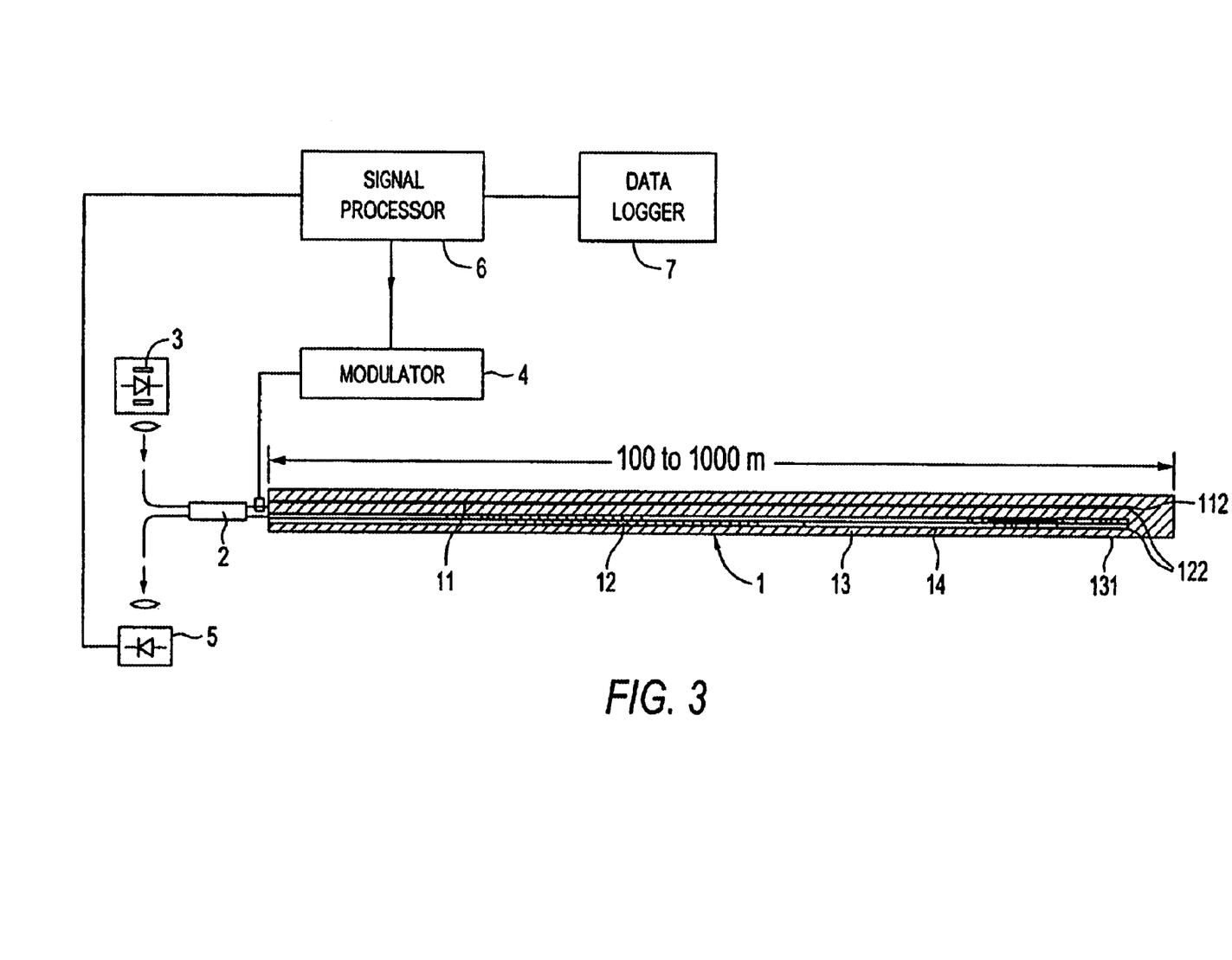
FIG. 3 is a combination side view, and schematic block diagram, of the preferred embodiment of a fiber-optic infrasound detector, using two fiber optic pressure sensors, in accordance with the present invention.

The preferred composite infrasound sensor 1, proper, that is shown in FIG. 3 is a bit more complicated than the rudimentary sensor for containing two, as opposed to one, optical fibers. In either the rudimentary (not shown), or composite variants (shown in FIGS. 3–5) of the fiber optic pressure sensor, pressure variations along the fiber's length induce an optical path length change. Pressure-induced changes in optical length are as follows:

$$\Delta l_{op}/l_{op} \alpha \int \Delta P(x) dx$$

The change in optical length relative to optical length is proportional to the integral of the changes in pressure along the length of the optic fiber.

Thus pressure changes along a transmission path within an optical fiber can be sensed by monitoring the time delay of radiation transmission within the fiber, and changes in this time delay. More usefully, pressure differences occurring along two transmission paths within two optical fibers can be sensed by interferometrically monitoring the optical phase between light transmitted in each of the two fibers. This technique is sensitive to the integrated pressure along the fiber. The apparent pressure change P inferred from the observed optical path change along a fiber of length L is governed by $$P = L^{-1} \int P(x) dx$$

Thus pressure variations P(x) (at position x along the fiber) a having a spatial scale shorter than the total length of the fiber sensor L will be averaged away. An optical fiber is a true, linear, integrator whose incremental step-size is the order of the fiber diameter (125 $\mu$m). Because the phase delay variation along the fiber is governed by the speed of light rather than the speed of sound as in the mechanical filters, the response will be perfectly flat up to very high frequencies.

As has been well studied, the optical path, length in an optical fiber is, controlled primarily be three factors: 1) the fiber's physical length, 2) the temperature of the fiber, and 3) the hydrostatic pressure surroundings the fiber. The temperature and pressure coefficients arc respectively $10^{-5}$ °C.$^{-1}$ and $10^{-6}$ bar$^{-1}$ (Hocker, 1979). The relationship between an optical fiber's physical length change dl and it's optical path change $dl_{op}$ is 1.16 dl (Zumberge, et al. 1988). In the design of an optical fiber sensor aimed at monitoring pressure changes, it is important to minimize the sensitivity to strain and to temperature.

The rest of the components 2–7 shown in FIG. 3 serve to make the composite fiber optic infrasound sensor 1 into a full infrasound detection system.

In greater detail, the infrasound sensor 1 shown in FIG. 3 is a first embodiment shown at expanded scale in side view in FIG. 4a, and in cross-sectional view in FIG. 4b. The first embodiment sensor 1 consists of a sensor fiber 11 and a reference fiber 12. The reference fiber 12 is inside a sealed tube 14, preferably a stainless steel tube and more preferably a stainless steel tube of approximately 0.030" diameter. The tube 14 is preferably filled with a gas 141, normally air. Both the reference optic fiber 12 inside the sealed tube 14, and the sensor optic fiber, are contained within, and protected by an outer tune 13, preferably made of soft plastic or rubber.

The tube 13 is preferably fluid filled, normally with a fluid 132 that is typically air, water or ethylene glycol. The ends 112, 122 of both fibers 11, 12 are mirror surfaces, and are normally silvered. The overall length of the infrasound sensor 1 is preferably from 100 to 1000 meters, as illustrated.

The optic fiber infrasound sensor 1 is combined with components 2–7 to make a full infrasound detection system. A fiber splitter 2 splits an illumination signal received from a laser 3, preferably a laser diode, and communicates it into both fibers 11, 12. The signal is modulated by the modulator 4, and reflects within the fiber optic. The optical (light) reflected signals in and from each fiber 11, 12 are detected in detector 5, and are passed as an electrical signal to the signal processor 6. The signal processor 6 mathematically combines the two signals, and determines therefrom at least the infrasound component of the sensed pressure, and logs at least this data to the data logger 7. The data logger 7 may be a locally-situated storage medium, or may be connected over a communication path to a remote location.

In operation, the entire infrasound detection system of FIG. 3 serves as a Michelson (or Mach Zehnder, or equivalent) interferometer. The "legs" of the interferometer are formed by the two optical fibers, labeled as the reference fiber 12 and the sensor fiber 11. Both fibers 11, 12 are housed in a flexible tube 13 filled with a fluid 132, preferably a fluid that does not freeze under conditions normally encountered such as ethylene glycol. However, the sensor fiber 11 is directly immersed in this fluid 132 while the reference fiber 12 is held hermetically isolated inside the gas 141 of sealed stainless steel tube 14 that is itself inside the fluid 132 of the tube 13. Because both fibers 11, 12 respectively reside within the fluid 132 and the gas 141 they will reach the same temperature equilibrium and subsequent temperature fluctuations (and strain fluctuations) will be substantially common to both fibers 11, 12. Because, however, one of the two fibers—fiber 12—is sealed from ambient pressure, pressure induced changes in the two fibers 11, 12 will not be common.

In a configuration of the illustrated type having a length of 1000 m, a 0.1 $\mu$bar pressure change will induce an optical path imbalance of 0.1 nm or 0.0003 fringe. This is within the noise figures commonly attained with fiber optic gyros, for example, in the frequency band of interest (0.4 Hz to 10 Hz).

The fiber optic based pressure and infrasound detection system consists of an equal-arm Michelson (or Mach-Zehnder, or equivalent) interferometer having optic fiber pressure sensors in which one fiber (fiber 11) is coupled to atmospheric pressure changes while the other (fiber 12) is not. Housing both fibers 11, 12 within a flexible, fluid-filled, tube 14 allows for common mode rejection of temperature and strain noise. The sensor fiber resides within a 0.030-inch-diameter stainless-steel tube having 0.003-inch wall. This hermetically sealed tube has been tested at deep-ocean hydrostatic pressures, yet is flexible and straightforward to work with. Silvering the ends of the two fibers allows a single active end in the instrument. This facilitates simple rearrangement of the instrument in the field to optimize averaging of wind-induced noise.

Figure 6:
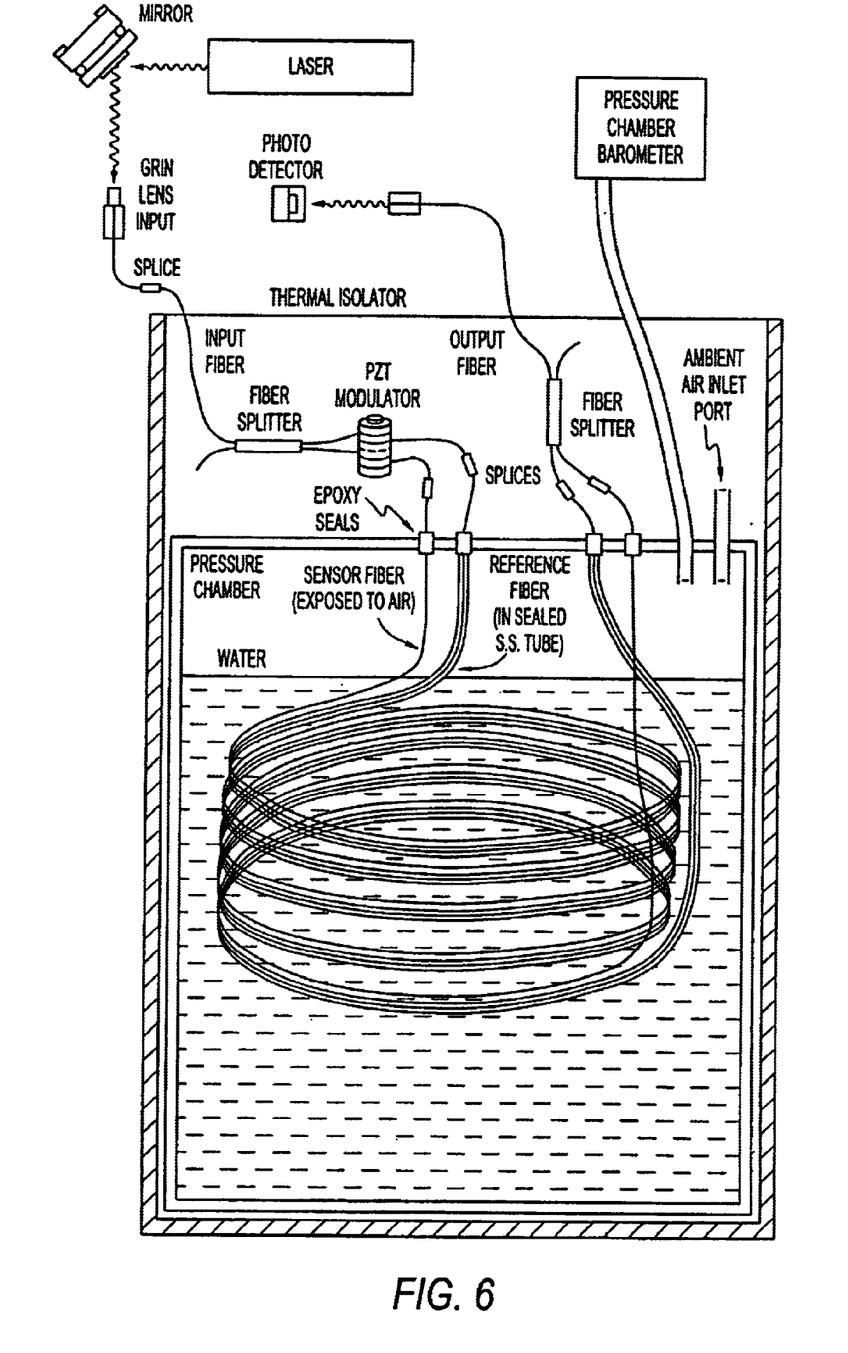
FIG. 6 is a diagrammatic view of a first test apparatus—a pressure chamber—for testing the preferred embodiment of the fiber-optic infrasound detector in accordance with the present invention, previously seen in FIG. 3.

A second embodiment of the composite optic fiber pressure sensor 1a is shown in FIG. 6. Instead of having the sensor fiber 12 located directly in the fluid 132 of the outer tube 13, it is located in its own stainless steel tube 111 which is, however, abundantly perforated. The intent of the tube 11 is to mechanically and thermally mimic the tube 14—with the important exception that hermetic sealing of optic fiber 11 against atmospheric pressure variations (as optic fiber 12 is shielded) is not realized.

4. Performance

A diagrammatic view of a test chamber for the preferred embodiment of the fiber-optic infrasound sensor in accordance with the present invention, just seen in FIG. 3, is shown in FIG. 4.

Measurements have been taken of the performance of the preferred embodiment of the fiber-optic infrasound sensor in accordance with the present invention, previously seen in FIG. 3, within the test chamber, previously seen in FIG. 5. The measured sensitivity to pressure of the sensor 1 of FIG. 3 shows good agreement with a conventional pressure sensor and demonstrates the viability of the new technique of the present invention.

A cross-sectional view of a trough in which the preferred embodiment of the optic fiber infrasound sensor, and the overall optic fiber infrasound detection system, in accordance with the present invention, previously seen in FIG. 3, has been further tested is shown in FIG. 6. The trough test is particularly directed to assessing the effects on the sensor, and on the detection system, of temperature variations. Sensitivity to temperature variation was substantially reduced, as previously taught.

Figure 7:
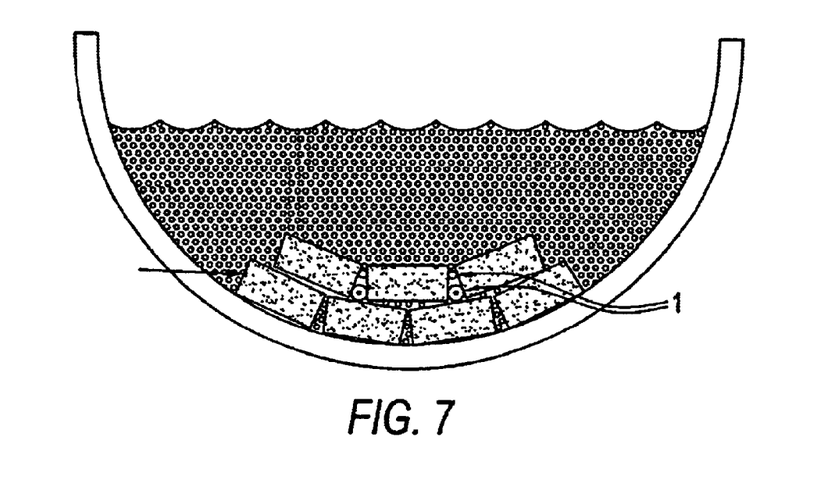
FIG. 7 is a cross-sectional view of a second test apparatus a circular trough for testing the preferred embodiment of the fiber-optic infrasound detector in accordance with the present invention, previously seen in FIG. 3.

A diagrammatic view of a mechanical amplifier for the preferred embodiment of the fiber-optic infrasound sensor in accordance with the present invention, previously seen in FIG. 3, is shown in FIG. 7. An unconstrained optical fiber's response to pressure is rather small. The actual coefficient relating the optical path length change to pressure change depends on both the opto-mechanical characteristics of the fiber and its thermal environment (as an adiabatic temperature change in the fluid around the fiber accompanies a pressure change).

In accordance with an important subsidiary aspect of the present invention, one way to enhance the pressure effect on the fiber is to couple the fiber to a deformable membrane (e.g., a rubber tube) which strains the fiber as a pressure change causes the deformable tube to expand or contract. A compliant, sealed, tube 81, which serves as a mandrel, is shown wrapped both (i) loosely, with an optical fiber in a stainless steel tube 82, and (ii) tightly, with a bare optical fiber 83. The pressure-induced strain in the fiber 83 can be one or two orders of magnitude greater than the effect of pressure acting on the fiber alone. In a preliminary laboratory experiment on a 33-cm long example of a rubber tube 81 wrapped with an optical fiber, the r.m.s. noise in the band from 0.12 Hz to 8 Hz was 1 Pa. The signal to noise ratio is expected to drop dramatically as a longer tube is employed.

Figure 8:
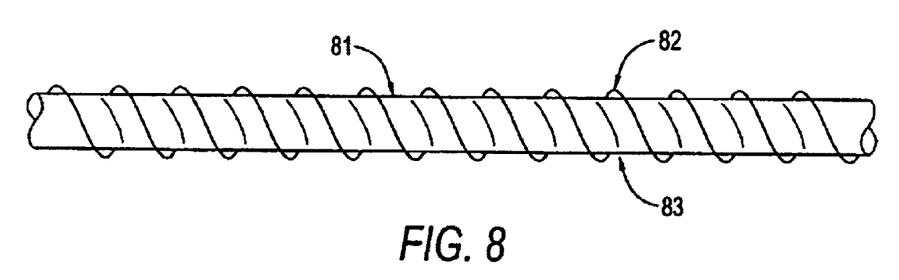
FIG. 8 is a diagrammatic view of adapting the fiber optic pressure sensor of the present invention, previously seen in FIG. 3, as a mechanical amplifier.

FIG. 8 is a schematic block diagram showing the manner of the preferred connection of components for transforming two interferometric optical signals into two—a sine and a cosine—corresponding electrical signals in the fiber-optic infrasound detection system in accordance with the present invention, previously seen in FIG. 3. The two optical (light) signals from the two optic fibers 11, 12 (shown in FIG. 3) are, transformed into a corresponding two electrical signals.

Figure 9:
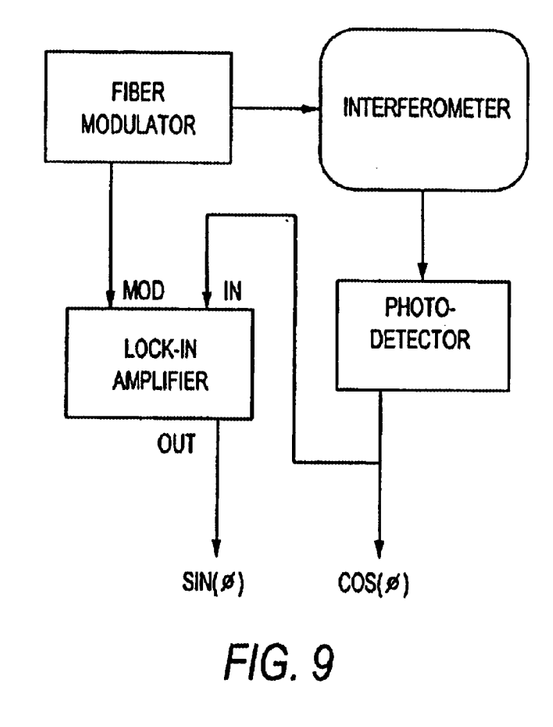
FIG. 9 is a schematic block diagram of the preferred embodiment of the components for transforming two interferometric optical signals into two—a sine and a cosine—corresponding electrical signals in the fiber-optic infrasound detector in accordance with the present invention, previously seen in FIG. 3.
Figure 10:
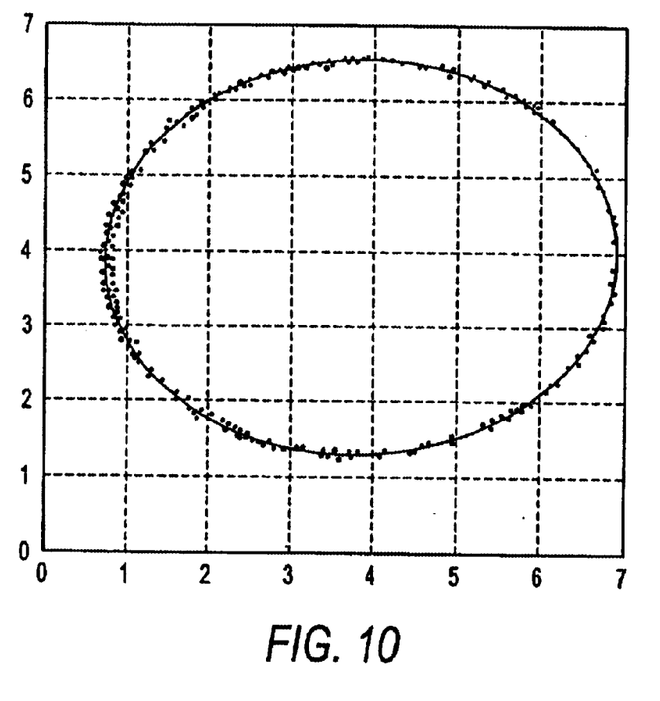
FIG. 10 is a graph of a test of the sine and the cosine signals of FIG. 9 during a pressure test of the fiber-optic infrasound detector in accordance with the present invention, previously seen in FIG. 3, within the first test apparatus previously seen in FIG. 6.

A graph of a these two electrical signals the sin and the cosine signals of FIG. 9—with one signal along each axis which graph might thus be realized on the display of an oscilloscope—is shown in FIG. 10. The many plotted points that trace out an ellipse were obtained during a pressure test of the optic fiber infrasound detection system in accordance with the present invention, previously seen in FIG. 3, within the chamber of the first test apparatus, previously seen in FIG. 6. The detection system has a smooth response to all magnitudes of simulated infrasound, which infrasound is simulated by the PZT modulator shown in FIG. 6. In a real-world deployment of the ultrasound detection system of the present invention, a single point—a point on the ellipse of FIG. 10—will appear upon the display of an oscilloscope. Upon an incipient infrasound pulse, or wave, this displayed point will deviate along the contour of the ellipse from it's quiescent location.

In accordance with the preceding explanation, variations and adaptations of the infrasound sensor, and infrasound detection system, in accordance with the present invention will suggest themselves to a practitioner of the electro-acoustic arts. For example, the two fiber optic sensors of the Michelson (or Mach-Zehnder, or equivalent) configuration interferometer could be separately housed.

In accordance with these and other possible variations and adaptations of the present invention, the scope of the invention should be determined in accordance with the following claims, only, and not solely in accordance with that embodiment within which the invention, has been taught.

What is claimed is:

1. A fiber optic pressure sensor having a fiber optic in which pressure is sensed by (i) injection of optical radiation into the fiber and (ii) detection of the change in optical length of the fiber proportional to change in the integral of pressure along the fiber CHARACTERIZED IN THAT the fiber optic extends in the atmosphere for greater than the coherence length of wind in the atmosphere.

2. The fiber optic pressure sensor according to claim 1 FURTHER CHARACTERIZED IN THAT the fiber optic extends substantially linearly in the atmosphere.

3. The fiber optic pressure sensor according to claim 2 FURTHER CHARACTERIZED IN THAT the fiber optic extends substantially linearly in the atmosphere for greater than one hundred meters.

4. The fiber optic pressure sensor according to claim 3 FURTHER CHARACTERIZED IN THAT the fiber optic extends substantially linearly in the atmosphere for greater than one kilometer.

5. The fiber optic pressure sensor according to claim 1 FURTHER CHARACTERIZED IN THAT pressure within the fiber optic is sensed by (i) injection of laser light optical radiation into the fiber.

6. The fiber optic pressure sensor according to claim 1 FURTHER CHARACTERIZED IN THAT the diameter of the fiber permits detection of atmospheric infrasound from at least 0.4 to 10 Hz frequency;

wherein, because the incremental step size of detectable variation in the propagation path along the fiber is in the order of fiber diameter, an appropriately small diameter permits of the detection of atmospheric infrasound.

7. The fiber optic pressure sensor according to claim 6 FURTHER CHARACTERIZED IN THAT the diameter of the fiber is less than 200 $\mu$m.

8. The fiber optic pressure sensor according to claim 1 FURTHER CHARACTERIZED IN THAT the optic fiber is subjected to a permanent pressure relative to which pressure changes in the atmosphere constitute an increment.

9. The fiber optic pressure sensor according to claim 8 FURTHER CHARACTERIZED IN THAT the optic fiber is so subjected to the permanent pressure by action of being wrapped around a mandrel of expandable diameter.

10. A fiber optic infrasound detection system comprising:

an equal-arm Michelson or equivalent type interferometer including a first optic fiber exposed to atmosphere and extending for greater than 100 meters, and a second optic fiber, hermetically sealed from the atmosphere, extending alongside the first optic fiber;

a source of modulated light transmitted along both fibers in accordance with any changes in optical length of the fibers responsively to, inter alia, pressures and temperatures and strains to which each fiber is subject; and a detector, receiving the light transmitted along both optic fibers, of changes in the optical length of both optic fibers, the detector sensitive in a frequency band including from at least 0.2 to 4 Hz so that changes in optical lengths as result from, inter alia, (i) changes in temperature and (ii) changes in strain including as are due to earth movement, are all substantially canceled due to the interferometric arrangement of the two optic fibers while (iii) atmospheric pressure changes arising both from wind and from infrasound are sensed in the frequency band;

wherein, because pressure changes due to the wind are not coherent over the greater than 100 meter extent of the optic fibers, detection of changes in optical length due to atmospheric pressure changes arising from the wind is a substantial integration of these wind-induced changes along the length of the fiber, and is much reduced from what would be detected by any sensing of pressure at but a single point in the atmosphere;

wherein the detector serves to sense atmospheric pressure changes due to infrasound over the lengths of both optic fibers at a high signal to noise ratio over atmospheric pressure changes due to any of (i) temperature, (ii) strain and vibration, and (iii) wind.

11. The fiber optic infrasound detection system according to claim 10 wherein the first optic fiber extends from the source of modulated light illumination to a mirrored end; and wherein the second extends alongside the first optic fiber from the source of modulated light illumination to a mirrored end, wherein light is reflected along both fibers in accordance with, inter alia, pressures and temperatures and strains to which each fiber is subject.

12. The fiber optic infrasound detection system according to claim 10 wherein the source of modulated light illumination comprises:

a laser.

13. The fiber optic infrasound detection system according to claim 12 wherein the laser comprises:

a laser diode.

14. The fiber optic infrasound detection system according to claim 10 wherein the first and the second optic fiber extend linearly.

15. The fiber optic infrasound detection system according to claim 14 wherein the first and the second optic fiber are extending linearly for a kilometer or more.

16. The fiber optic infrasound detection system according to claim 10 wherein the equal-arm Michelson or equivalent type interferometer includes, as well as the first and the second optic fiber, a metal tube hermetically sealing the second fiber.

17. The fiber optic infrasound detection system according to claim 16 wherein the equal-arm Michelson or equivalent type interferometer includes, as well as the metal tube hermetically sealing the second fiber, another perforated metal tube protecting the first optic fiber, and providing similar thermal and vibration characteristics to the first optic fiber as are provided to the second fiber.

18. The fiber optic infrasound detection system according to claim 16 wherein the metal tube hermetically sealing the second fiber comprises:

stainless steel.

19. The fiber optic infrasound detection system according to claim 10 wherein the detector of the light reflected in both fibers comprises:

a beamsplitter of (i) light from the source of modulated light illumination and (ii) the light reflected in both fibers;

a signal processor receiving a signal from the beamsplitter; and a modulator responsive to the signal processor for modulating light from the source of modulated light in accordance with the signal received by the signal processor;

wherein pressure changes within band are tracked.

20. A method of detecting infrasound comprising:

providing modulated light illumination from a light source;

extending co-parallel (i) a first optic fiber exposed to atmosphere, and (ii) a second optic fiber hermetically sealed from the atmosphere, each from the source of modulated light illumination to a mirrored end;

wherein light illumination from the light source is transmitted and is reflected along both fibers in accordance with, inter alia, pressures and temperatures and strains to which each fiber is subject; and detecting the light reflected in both fibers in a frequency band including from at least 0.2 to 4 Hz so that changes in optical lengths of both fibers as are due to, inter alia, variations in (i) temperature, (ii) strain including as is due to earth movement and (iii) pressure as arises both from wind and from infrasound, are detected;

wherein detected changes in optical length due to variations in (i) temperature and in (ii) strain are substantially canceled due to the interferometric arrangement of the two fibers;

wherein, because changes in optical length due to wind-induced pressure changes are not coherent over the extent of the fiber, so that the detection of pressure changes arising from the wind are substantially integrated along the length of the fiber and are much reduced from what would be detected by any sensing of pressure at but a single point in the atmosphere;

wherein the detecting primarily serves to sense atmospheric infrasound.

21. The method of detecting infrasound according to claim 20 wherein the providing of modulated light illumination is from a laser light source.

22. The method of detecting infrasound according to claim 20 wherein the extending co-parallel of the first optic fiber exposed to atmosphere, is linearly for at least 100 meters.

23. The method of detecting infrasound according to claim 22 wherein the extending co-parallel of the first optic fiber exposed to atmosphere, is linearly for at least 1000 meters.

24. The method of detecting infrasound according to claim 20 wherein the detecting comprises:

splitting in a beamsplitter of (i) light from the source of modulated light illumination and (ii) the light reflected in both fibers;

receiving in a signal processor a signal from the beamsplitter, and processing this received signal to cancel signal contributions from changes (i) in temperature and (ii) in strain including as are due to earth movement, while sensing (iii) pressure as arises both from wind and from infrasound.

25. The method of detecting infrasound according to claim 24 that, after the receiving and processing in the signal processor, further comprises:

modulating in a modulator responsive to the signal processor light from the source of modulated light in accordance with the signal received by the signal processor.

26. A fiber optic pressure sensor having a pressure sensor and a first optic fiber CHARACTERIZED IN THAT pressure is sensed by the pressure sensor in a band including from 0.2 to 4 Hz;

in the first optic fiber which is both exposed to atmosphere and extends linearly for greater than 100 meters;

wherein the first optic fiber is exposed to (i) atmospheric pressure changes arising both from wind and from infrasound as well as (ii) changes in temperature and (iii) changes in strain including as are due to earth movement;

wherein, because pressure changes due to the wind are not coherent over the linear extent of the first optic fiber, the (i) atmospheric pressure changes arising from the wind are substantially integrated along the length of the first optic fiber, and are much reduced from what would be detected by any sensing of pressure at but a single point in the atmosphere.

27. The fiber optic pressure sensor according to claim 26 having another, second, optic fiber FURTHER CHARACTERIZED IN THAT this other, second, optic fiber, is hermetically sealed from the atmosphere and extends alongside the first optic fiber; and pressure is also sensed by the pressure sensor in the second optic fiber;

wherein the pressures sensed in the two fibers may be combined as an equal-arm Michelson or equivalent type interferometer in order to realize substantial common-mode cancellation of (ii) changes in temperature and (iii) changes in strain, leaving that the two optic fibers substantially sense only (i) atmospheric pressure changes arising both from wind and from infrasound.

* * * * *

UNITED STATES PATENT AND TRADEMARK OFFICE
CERTIFICATE OF CORRECTION

PATENT NO. : 6,788,417 B1
DATED : September 7, 2004
INVENTOR(S) : Zumberge et al.

It is certified that error appears in the above-identified patent and that said Letters Patent is hereby corrected as shown below:

Column 1,
Lines 50 and 63, delete "or" and insert -- of --.
Line 62, delete "relics" and insert -- relies --.

Column 2,
Line 1, delete "clement" and insert -- element --.
Line 7, delete "are" and insert -- is --.
Line 39, delete "(CTBT)," and insert -- (CTBT). --.

Column 3,
Line 47, delete "a" and insert -- as --.

Column 5,
Line 37, delete "α" insert -- ∝ --.
Line 46, between "construction," and "changes" insert -- such --.
Line 52, between "can," and "sensed" insert -- be --.
Line 54, delete "meter," and insert -- meters --.
Line 67, delete "extends" and insert -- extend --.

Column 7,
Line 40, insert -- -- -- before and after "a circular trough".
Line 62, delete "signal-to-nose" and insert -- signal-to-noise --.

Column 8,
Lines 18-19, delete "–may be distinguished in the sensor".

Column 9,
Line 8, between "new sensor's" and "and new" delete ",".
Line 18, delete "equipments" and insert -- equipment --.
Line 21, delete "stain" and insert -- strain --.
Lines 29 and 53, delete "or" and insert -- of --.
Line 36, between "Ewing" and "1962" insert -- , --.

Column 10,
Line 14, delete "or" and insert -- of --.
Line 51, delete "are" and insert -- is --.

UNITED STATES PATENT AND TRADEMARK OFFICE
CERTIFICATE OF CORRECTION

PATENT NO. : 6,788,417 B1
DATED : September 7, 2004
INVENTOR(S) : Zumberge et al.

It is certified that error appears in the above-identified patent and that said Letters Patent is hereby corrected as shown below:

Column 11,
Line 10, delete "α" and insert -- ∝ --.
Line 29, delete "a" before "having".
Line 31, delete "true, linear, integrator" and insert -- true linear integrator --.

Column 13,
Line 51, between "electrical signals" and "the sin" insert -- -- --.
Lines 52-53, between "each axis" and "which graph" insert -- , --.
Lines 66-67, delete "it's" and insert -- its --.

Column 14,
Line 11, between "claims" and "only" delete ",".
Line 19, delete "for greater" and insert -- for a greater distance --.

Signed and Sealed this

Seventeenth Day of January, 2006

JON W. DUDAS
*Director of the United States Patent and Trademark Office*